Patented Jan. 5, 1926.

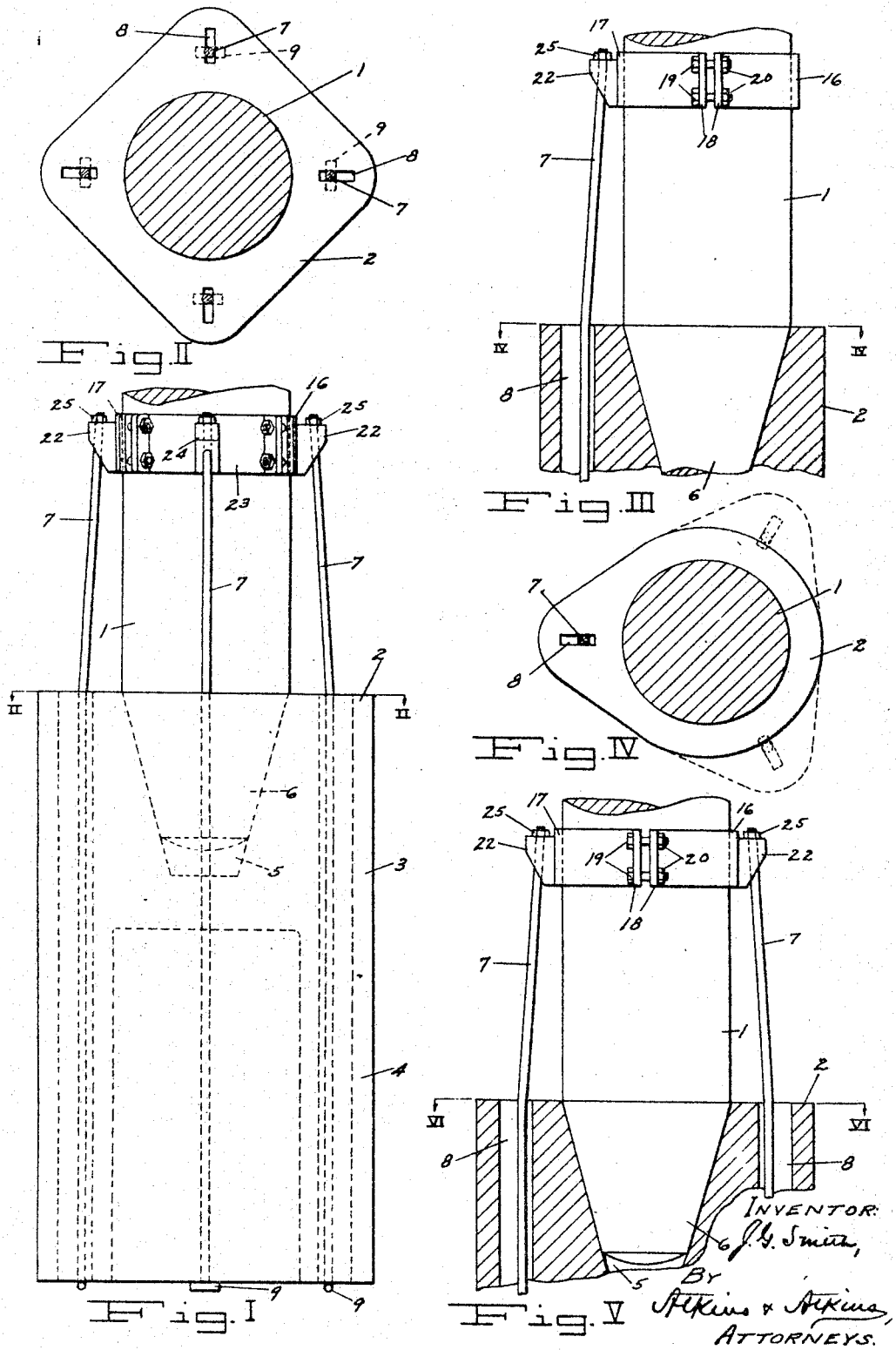

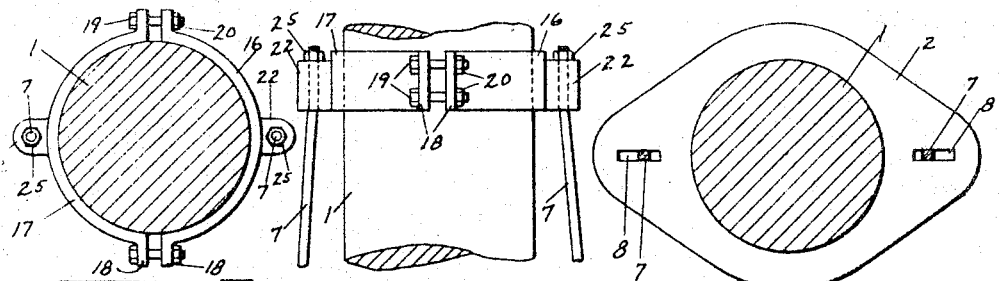
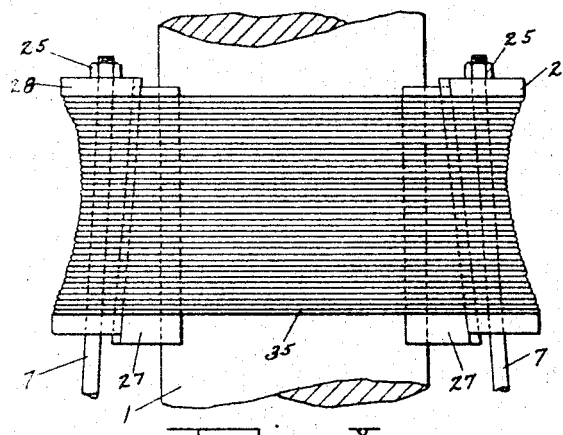
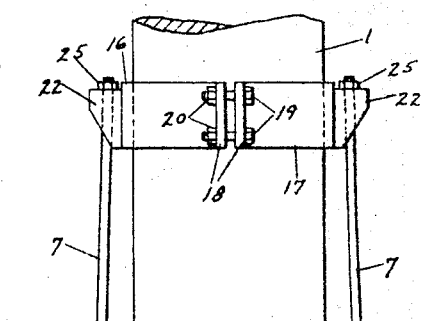
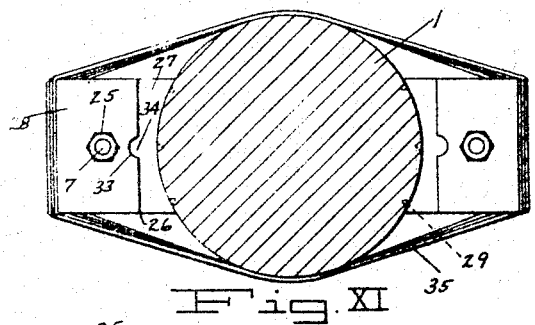
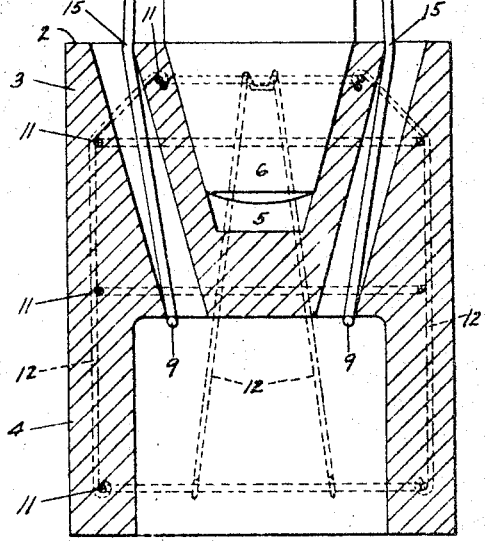
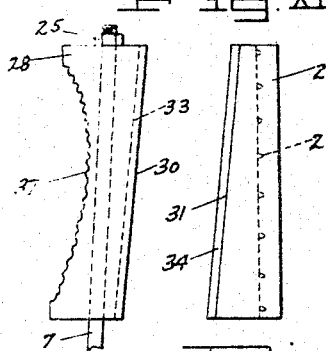

1,568,777

UNITED STATES PATENT OFFICE.

JEFFERSON G. SMITH, OF McDONOUGH, GEORGIA.

DEVICE FOR SETTING AND REPLACING POLES.

Application filed February 26, 1923. Serial No. 621,415.

*To all whom it may concern:*

Be it known that I, JEFFERSON G. SMITH, a citizen of the United States of America, and resident of McDonough, in the county of Henry, in the State of Georgia, have invented certain new and useful Devices for Setting and Replacing Poles, of which the following is a specification, reference being had to the accompanying drawings.

My invention relates to means for setting poles or posts upright in the earth, and has for some of its objects among others the production of means whereby any pole, such for example, as one intended for supporting electric line wires, may be set in the ground in such manner as to prolong its life in service, to fortify it against fracture under transverse strain, to provide for convenience of replacement of either pole or its brace members in case of need, and to provide for the resetting, without necessity for materially shortening its length, of an old pole whose butt is decayed below ground to such an extent as ordinarily to require renewal of the pole. Promotion of economy in the art to which it relates may, therefore, be stated to be the generic object of my invention.

An important economy achieved by my invention is in making it practicable to use cheap in place of expensive wood in pole construction. By my invention the life of a cheap pine pole, for example, may, with proper care bestowed upon its upkeep, be extended beyond that of the best lasting poles made of the most durable and expensive wood and erected under methods at present in use.

What constitutes my invention will be hereinafter specified in detail and succinctly set forth in the appended claims.

In the accompanying drawings,

Figure I is a side elevation of the lower end of a pole and its base united in accordance with my invention. In the form of embodiment shown in this figure, four brace-rods for securing the pole to the base are used as shown in the next figure.

Figure II is a cross section on the line II—II of Figure I.

Figure III is a longitudinal vertical medial section of a base as shown in Figure I with the pole set therein in side elevation and secured thereto by a single brace-rod.

Figure IV is a cross section on the line IV—IV of Figure III, with dotted lines to indicate a three brace-rod construction.

Figure V is a partial view corresponding to Figure III.

Figure VI is a cross section on the line VI—VI of Figure V.

Figure VII is a side elevation of a base of modified construction in respect to its being provided with reinforcement and to the disposition of brace-rods.

Figure VIII is a side elevation of one form of my brace-rod collar attached to a pole and to brace-rods shown as broken away.

Figure IX is a top plan view of the subject matter of Figure VIII.

Figure X is a view similar to Figure VIII showing a modified form of brace-rod collar.

Figure XI is a top plan view of the subject matter of Figure X.

Figure XII shows in side elevation and in group arrangement the two cooperating members of the collar tightener shown in Figures X and XI.

Referring to the numerals on the drawings, 1 indicates a pole or post to be set in place for service, and 2 a base therefor, or that portion of the combination that is sunk below ground and which constitutes a support for fixing the position of the member 1. In making of the part 1 a piece of sound wood of any kind and suitable shape preferred may be used. It has been heretofore, and still is generally, the common practice in setting a pole to dig a hole in the ground of sufficient diameter and depth, and to set the pole therein, filling the space between the outside of the pole and inside wall of the hole with earth or other suitable material.

At best, this method exposes the underground portion of the pole to decay, and for that reason it has always been considered good practice to select certain kinds of woods having a high degree of resistance to decay under ground, and frequently to increase the power of such resistance by special treatment. Such woods have generally been comparatively expensive, and the ever increasing demand has increased the cost in some localities and for some kinds of wood to a prohibitive extent.

By my invention, as was heretofore stated, the use of the cheapest kinds of wood is not only made practicable, but, by proper initial treatment and careful subsequent inspection and upkeep, is made to give longer service than the most costly stock set in the ground will give. Moreover, old poles of any description which are rotted at the base even to the point of breakage but remaining sound above ground, may, by my invention, be restored to service and made to serve, in every respect, as well as new poles, as will be presently explained.

The base 2 is preferably made of concrete, consisting for example, of any suitable and preferred mixture with water of cement, sand, and coarse ingredient, with or without reinforcement as desired, and may be made either in place where it is intended to be set, or elsewhere, as in a factory, and of concrete or other material as preferred.

The size, dimensions, and shape in exterior as well as in cross-sectional contours of the base 2, may be varied at discretion to suit the preference of the maker. In the forms illustrated, for example, in the drawing, the base comprises a crown 3, which is sufficiently massive to accommodate it to its office, and with a depending skirt 4, which might be made solid but is preferably hollowed with the object of economy of material.

In the top of the base 2 I provide a socket 5 of any preferred depth and shape in cross-section, and of transverse dimensions corresponding to the size of the pole for which it is intended. The requisite dimension of the socket 5 determines the mass of the crown 3 when that feature is included in the form of the base.

Into the socket 5 the butt of a pole previously shaped to form a tenon 6 to fit the socket but preferably not to extend to the bottom thereof, is set, in final assemblage of the members 1 and 2, in the place selected for erection of the pole. The shaping of the tenon of a new pole may be merely a matter of trimming the wood to desired shape and dimensions; but if the work be that of resetting an old pole it is first necessary to cut away the end of the pole until a butt of sound wood is developed. Afterwards the shaping of the butt to form a tenon is effected as in the making of a new pole.

In setting a pole, the base selected for it is either made in place in the ground, or it is sunk and tamped into a hole therein prepared for it, and provision is made in the base for the accommodation of a brace-rod or rods 7.

As many rods as may be necessary or desirable are used, and they are disposed to resist lateral strain upon the pole occasioned by tension upon the wire or wires which the pole is designed to carry. If such strain is exerted in only one line of direction, for example, a single brace-rod as shown in Figures II and IV may be used. The number of brace-rods may be multiplied indefinitely as is suggested in other figures of the drawings.

The brace-rod or rods 7 may be incorporated in the body of the concrete which preferably constitutes the base 2, but I prefer to provide in the base rod-conduit or conduits 8, made oblong in cross section to permit the introduction therein of a cross-head 9 on one end of the rod. By this provision the cross-head of a rod may be inserted and after penetrating the conduit may be turned so as to anchor the rod to the base. In this manner means of renewal of broken rods, if breakage should occur in use, is provided.

In Figure VII, I illustrate a preferred method of reinforcing the concrete of a base 2, if reinforcement be desired. In that figure, a vertical succession of metal rings 11, coaxial to the longitudinal axis of the base is shown, in combination with metal loops 12, engaging the top and bottom rings, respectively. The brace-rods are introduced into conduits which pass through the loops 12 near their looped ends, respectively, and so find increased security of anchorage. Also, in this figure, the brace-rods are, for increased security, shown as inserted into the base at an angle to its longitudinal axis, and are shown as bent as indicated at 15.

Around the pole 1 at any suitable height above the top of the base 2, I provide a collar which is in service fastened to the pole. The form of collar shown in all the figures of the drawings save the last three comprises a pair of arcuate plates 16 and 17 which are provided, respectively, with terminal flanges 18.

The said flanges are provided respectively, with perforations suitable for accommodation of one or more headed bolts 19, whose nuts 20 are adapted to constrict the plates 16 and 17 into secure engagement with the pole. Each of the said plates is usually provided with a brace-rod connecting member, preferably an integral ear 22, which is vertically pierced by an aperture for the reception of a threaded end of a brace-rod 7; but if a single rod is used, as shown in Figure III, for example, one of the plates 16—17 may be made without an ear 22.

On the other hand, if more than two brace-rods are to be accommodated in the collar, the collar may be provided with an intermediate section 23, having an ear 24 correspondent in form and function with the ear 22, with its complement of terminal flanges and bolts as is clearly shown, for example, in Figure I.

After the collar is fixed to the pole each brace-rod being first passed through the aperture provided for it in an ear 22 or its equivalent, a nut 25, threaded to the end of each rod protruding beyond the ear, is screwed down against the face of the ear until sufficient tension is brought to bear upon the rod to unite the pole and the base in firm union. If more than one brace-rod is employed the union may be perfected by tension upon the rods, but when a single rod is used, the tension upon the line wire which is strung upon the pole is needed to coact with the rod in order to effect the firmness of union ultimately desired.

A form of collar different from any which has been described is illustrated in the last three figures of the drawings. Referring to those figures, 26 indicates each one of a pair of clamps, of which each comprises an elongated channelled member 27 which is preferably provided with tangs 29 representative of any suitable means, if any be found necessary in any instance, for effecting fixed engagement between a pole and the clamps 26 in service. The web is provided on its edge opposite the member 27 with an inclined face 30.

Against each face 30 works a cooperative inclined face 31 provided upon a tension plate 32. Complementary grooves and ribs 33 and 34, respectively, are provided upon the respective opposing faces 30 and 31 to prevent lateral disalignment in operation of conjoined members 26 and 32.

Each of the tension plates 32 constitutes a brace-rod connecting member, being provided with a longitudinal aperture for the accommodation of a brace-rod 7 substantially after the manner of the collar already described and subject to like exceptions as specified in reference to the ears 22. In use, the members 26 and 32 are assembled, for example, in the manner illustrated in Figure X, and are secured, as shown, for example, in that figure to the interposed pole 1 by the aid of a constricting member 35. The member 35 preferably consists of a continuous length of stiff strong wire wrapped and fastened about the assemblage of members last referred to, and held in place as by a transversely corrugated saddle 37 in which form the outer wall of each tension plate 32 is preferably furnished, as shown also in the figure last named.

After the assemblage last described is completed by the application of the constricting member or wire 35, all that remains to be done in order to perfect the union of the pole and base, is to turn the nut or nuts 25 until required tension upon the rod or rods 7 is attained. In this connection it should be observed that said tension tends to cause the member 32 to slide down the inclined face 30 of its complementary member and thereby to act with wedging effect to tighten the hold of the wire 35 about the assemblage of members which it serves to bind to the pole.

The description of operation included in the body of the foregoing specification appears to require no enlargement, particularly in view of the clearness of illustration afforded in the drawings.

What I claim is:

1. In a device of the class described, a base adapted to be sunk into the ground and having integrally formed therein a socket adapted to receive the butt of a pole, a collar adapted to be secured to the pole above the base, and brace rods separably secured to the base and connected to the collar to unite the pole and base, said base being provided with a plurality of channels extending downwardly therein around said socket, the channels being elongated in cross section, elongated enlargements on said rods adapted to fit into said channels in one position and adapted to interlock with the base outside the channels when the rods are turned in said channels.

2. In a device of the class described, a base adapted to be sunk into the ground and having integrally formed therein a socket adapted to receive the butt of a pole, a collar adapted to be secured to the pole above the base, and a brace rod separably secured to the base and connected to the collar to unite the collar and base, said collar comprising a plurality of pairs of blocks, the members of each pair being relatively movable and having meeting faces at least one of which is inclined with respect to the longitudinal axis of the pole and binding means for uniting said pairs of blocks to the pole, the brace rod being secured to one of said blocks.

3. In a device of the class described, a base adapted to be sunk into the ground and having integrally formed therein a socket adapted to receive the butt of a pole, a collar adapted to be secured to the pole above the base, and a brace rod separably secured to the base and connected to the collar to unite the collar and base, said collar comprising a plurality of pairs of blocks, the members of each pair being relatively movable and having meeting faces at least one of which is inclined with respect to the longitudinal axis of the pole, binding means for uniting said pairs of blocks to the pole, and means for preventing lateral relative movement between the members of said pairs of blocks, the brace rod being secured to one of said blocks.

4. In a device of the class described, a pole base adapted to receive the pole butt, tensioning means for securing the pole to the base comprising tension rods secured to the base and a collar on the pole to which the tension rods are anchored, said collar comprising a plurality of pairs of blocks, the members of each pair being relatively movable and having meeting faces inclined with respect to the longitudinal axis of the pole to provide a wedging action between the members, and binding means for uniting said pairs of blocks to the pole, the tension rods being secured to one member of each pair of blocks.

In testimony whereof, I have hereunto set my hand.

JEFFERSON G. SMITH.